United States Patent [19]

Durkee

[11] 4,294,434

[45] Oct. 13, 1981

[54] HEAVY METAL REMOVAL APPARATUS

[76] Inventor: Richard G. Durkee, 3616 W. Pendleton, Santa Ana, Calif. 92704

[21] Appl. No.: 115,039

[22] Filed: Jan. 24, 1980

[51] Int. Cl.$^3$ ............................................. C22B 15/12
[52] U.S. Cl. ........................................ 266/170; 75/99; 75/109; 75/117; 266/79; 266/81; 266/101
[58] Field of Search .................... 266/170, 79, 81, 101; 75/109, 117, 99

[56] References Cited

U.S. PATENT DOCUMENTS

| | | | |
|---|---|---|---|
| 705,589 | 7/1902 | James | 266/170 |
| 1,349,086 | 8/1920 | Murphy | 266/170 |
| 3,301,542 | 1/1967 | Medford et al. | 266/101 |
| 3,748,124 | 7/1973 | Case et al. | 75/121 X |
| 3,840,365 | 10/1974 | Hammes et al. | 75/109 X |
| 3,905,827 | 9/1975 | Goffredo et al. | 75/117 X |

*Primary Examiner*—G. Ozaki
*Attorney, Agent, or Firm*—Thomas A. Turner, Jr.

[57] ABSTRACT

A gravity fed water bath process treats waste water from spray rinses containing compounds of copper and like heavy metals. For displacing heavy metals, such as copper, the bath has a substantially pure metal with an electrode potential greater than the heavy metal contained in the rinse water. A system for controlling the pH level of the water bath treatment and for supplying acid at the beginning of the bath, and alkaline at the end of the bath provides a highly acidic pH level for the water bath and heavy metal removal chamber, and adjusts the pH level of the discharged water for satisfactory deposit in municipal sewer systems.

A method for displacing the heavy metal from the compound in solution requires exposing the heavy metal compound to a substantially pure metal having an electrode potential greater than the heavy metal of the compound, in an acidic bath whose pH level is controlled. The control of the pH is accomplished by acid sensing probes connected in circuit with a valve control which injects and mixes acid in the bath of a treatment chamber.

15 Claims, 4 Drawing Figures

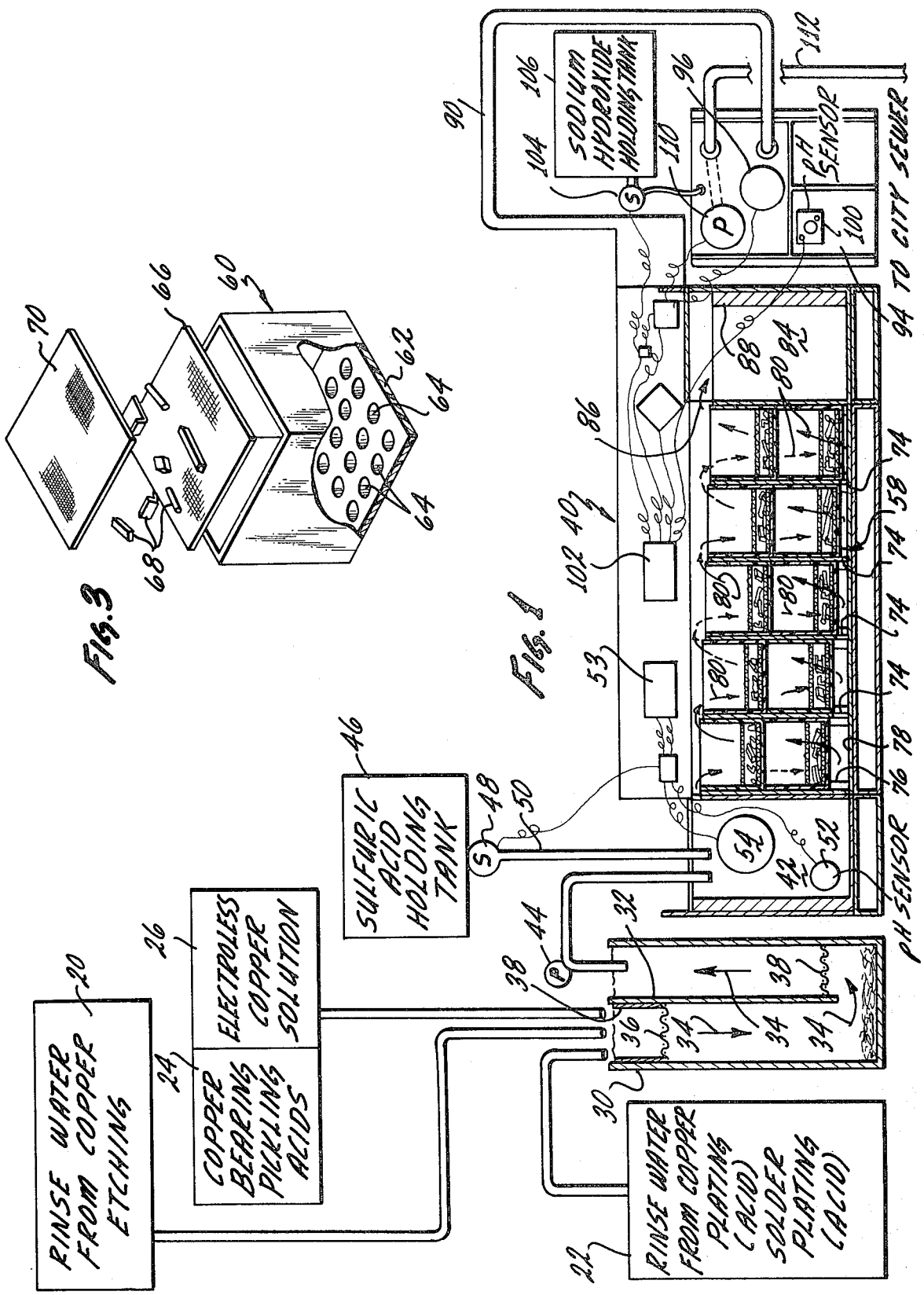

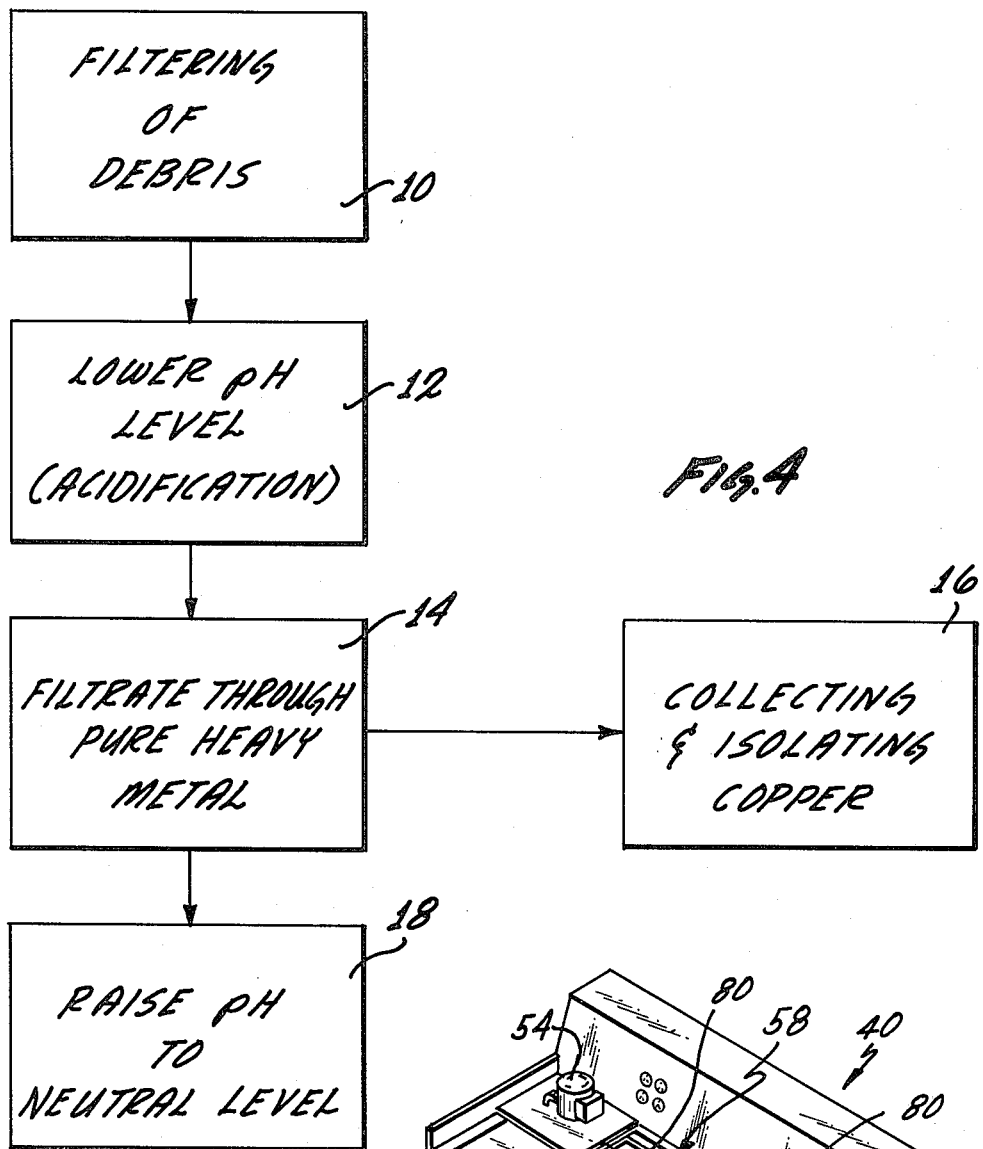

HEAVY METAL REMOVAL APPARATUS

BACKGROUND OF THE INVENTION

1. Field of the Invention

The present invention relates to the art of treating heavy metal-bearing aqueous solutions used in plating and metal finishing processes, and more particularly relates to the reduction or displacement of poisonous heavy metals such as copper from waste waters for preparing the waste water prior to discharge in municipal sewers.

2. Description of the Prior Art

Heavy metal plating is accomplished frequently by an aqueous solution or bath process which can be electrolytic or electroless. In almost all cases, high concentrations of the heavy metal are maintained. If the heavy metal is poisonous, such as, for example, copper (Cu), or is otherwise objectionable, problems are presented when excess solutions must be discharged. For example, copper and copper-bearing compounds are usually not permitted above limited concentrations in municipal sewer systems, and therefore the copper must be reduced below the concentration limits. In the case of metal hydroxides, for example, a common method of reducing concentration is precipitation. Hereinafter in this specification and in the claims, the term "precipitate" will be used to mean the separating in solid form of a substance from a liquid as the result of a chemical or of a physical change, as from the addition or subtraction of electrons or electron energies. An attempt is made to collect the precipitate in a filter and to deposit the filtrate in municipal dumps. This method of elimination is unsatisfactory and only partially successful, because the metal hydroxide dissolves and percolates back into the underground water table. Another method of reducing concentration amounts is to add very substantial amounts of water.

Heavy metal plating techniques are used often in the manufacture of printed circuit boards. Printed circuit boards and printed wire boards are manufactured in the United States principally by photographic techniques at the present time. These techniques involve the plating of the substrate fiberglass or silicon with an electrically conductive metal, frequently copper (Cu), which covers the entire circuit board. Photographic etching techniques are then employed to remove the copper from the areas of the board which are intended to be non-conductive in accordance with a circuit pattern predetermined by the design engineer.

The copper is removed by etching techniques which frequently call for covering the copper-plated circuit board only over those particular areas which are to be conductive, thus exposing the copper in the plated area which is to be removed. Acid or alkaline etchants are used to etch the exposed copper. The etched copper, very often in the form of copper sulfate ($CuSO_4$), is rinsed away in solution by a flush or rinse of water. Hereinafter in this specification, the term water will be used to mean any liquid or fluid effluent comprising heavy metal or other contaminants, unless it is indicated that this means otherwise.

Copper is poisonous, and the discharge of water containing any substantial amount of copper in the municipal sewer system frequently subjects the manufacturer to stiff penalties. In addition, the environment systems of the watersheds and water bodies receiving the effluent are quite detrimentally altered. The customary method in the industry of removing the copper is to introduce great amounts of alkaline material as may be necessary. Alkaline material reduces the $CuSO_4$ to copper-hydroxide ($Cu(OH)_2$). The $Cu(OH)_2$ is fluffy in water, and forms a slime on the bath chamber. Some solutions of $CuSO_4$ and alkaline sulfate double salts such as $KCuSO_4.6H_2O$ may also be poisonous. The fluffy slime mentioned hereinabove concerns conservationists and environmentalists when it appears in the municipal effluent.

In its pure, anhydrous form, $CuSO_4$ is a colorless salt which readily absorbs water to form the blue pentahydrate [$CuSO_4.5H_2O$] known as "blue vitriol." Copper is very poisonous in all of its forms to low organisms, especially algae, and is used in controlled amounts in swimming pools and water works to prevent the growth of such organisms.

It has long been desired to have a process for removing such objectionable heavy metal from the bath water in industrial systems, and which reduce water requirements. It has further been sought to remove such objectionable heavy metal while leaving a substantially clear liquid having essentially a neutral pH without fluff, slime and similar debris, so that the substantially clear neutral and non-poisonous liquid can be drained into municipal sewer systems without endangering the environment or subjecting the plant to sever sewer fines.

SUMMARY

In brief, in accordance with one aspect of the present invention, a method of removing copper from the etch rinse in a printed circuit board manufacturing process is described. The rinse water from copper etching, copper plating and solder plating processes, as well as the water from copper bearing pickling acids and electroless copper solutions are collected in a chamber which initially filters debris from the liquid. The rinse water containing substantial amounts of copper-bearing compounds, is collected in a mixing tank where the pH level is lowered substantially by the addition and blending of sulfuric acid ($H_2SO_4$). Probes capable of sensing the pH, valve the flow of sulfuric acid to the blending chamber or mixing tank.

After adjusting the pH of rinse water, making it highly acidic, the rinse water flows into a displacement chamber in a path for approximately three hours. In this flow, the rinse water filtrates over substantially pure metal aluminum. The copper is replaced by aluminum in the sulfate compound, and the copper precipitates as pure metal copper to the bottom of the displacement chamber. The water is then discharged into a second mixing tank.

The second mixing tank may be a collection tank for not only the copper removal process described here, but also for the effluent from other processes in the plant. The second mixing tank is the last processing of the rinse water prior to its discharge into the municipal sewer system. In this second mixing tank, the pH is raised to a neutral level by the addition of sodium hydroxide (caustic) from a conveniently placed caustic (NaOH) holding tank. A pH sensing probe controls a valve which regulates the flow of NaOH into the collected effluent. The effluent from the collection chamber is pumped or otherwise directed into the sewer system in a substantially copper-free, acid neutralized water which is reasonably clear, free of slime and generally within standard municipal sewer acceptability guidelines.

An apparatus for carrying out the copper reclaiming process is described having a displacement chamber wherein the liquid can filtrate in a relatively small space for approximately three hours over relatively pure metal tailings held at various predetermined points along the flow path. Initially, a relatively deep collecting chamber receives the rinse water from the copper etching, copper plating and solder plating processes, and filters the masks, fiberglass chips and other debris before the liquid is pumped to an acidifying and mixing chamber. The liquid flows from the acidifying and mixing chamber into the displacement chamber where it follows a generally labyrinthine path to filtrate over the relatively pure metal tailings by gravity feed. A trough underneath the displacement chamber collects the pure metal copper being displaced in the process. A splash guard protects the area surrounding the displacement chamber, and directs the liquid to a second mixing chamber. The second mixing tank collects the filtrated water.

Probes sensing the pH in both of the mixing chambers or tanks control valves to add chemicals for adjusting the pH level. The valve leading from a sulfuric acid holding tank to the acidifying and mixing chamber constantly maintains the liquid in the acidifying chamber at a pH of approximately 1.5 to 2.5. The mixing tank receiving the liquid from the displacement chamber has its pH raised to approximately neutral levels by the addition of caustic from a conveniently located holding tank. A solenoid valve connecting the caustic holding tank to the second mixing tank is controlled by electronic signals from the pH sensing probes.

Blending equipment is placed in each of the mixing tanks for blending the chemical, either acid or caustic, for achieving a more uniform pH throughout the tank. Pumps may assist the liquid in the final mixing tank to the city sewer system.

The aluminum or other relatively pure metal tailings are held in a box made from plastic that is inert relative to the metal which it contains, and inert with regard to the acids and the acidic nature of the liquid going through the displacement chamber. The box contains a grated flooring over which the tailings are placed, so that the liquid will flow through the grates and the tailings to filtrate, maximizing the surface area of relatively pure metal exposed to the $CuSO_4$-bearing liquid.

Other novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be understood, however, that the drawings are for the purpose of illustration and description only, and are not intended as a definition of the limits of the invention.

BRIEF DESCRIPTION OF THE DRAWINGS

FIG. 1 is an elevational cross-section of a displacement chamber, and a partial, schematic block diagram illustrating the preferred embodiment of the present invention;

FIG. 2 illustrates in a perspective view the preferred embodiment of an apparatus for displacing copper in the present invention;

FIG. 3 is an exploded, partially cutaway view in perspective showing a relatively pure metal retaining box of the preferred embodiment of the invention; and FIG. 4 is a block diagram indicating the method of the present invention in schematic, block form.

DESCRIPTION OF THE PREFERRED EMBODIMENT

A system and apparatus is illustrated for removing or reclaiming copper from copper compounds in solution in the rinse water from copper etching, copper plating and solder plating processes in printed circuit board manufacturing techniques, reference being had initially to FIGS. 1 and 2. The rinse water from the copper etching process 20, and the rinse water from the copper plating and solder plating processes 22 are collected in a collecting chamber 20. Other residual and waste liquids containing copper, such as copper bearing pickling acids 24 and the electroless copper solutions 26 in the printed circuit board manufacturing process, are also collected in the chamber 30.

Collecting chamber 30 comprises a tank having a baffle 32 separating it into substantially two sections. The copper-bearing liquids will be introduced to the chamber 30 in one of the sections, and pumped out of the other section into the reactive chamber 40, which will be described in greater detail below. The flow of water through the collecting chamber 30 is indicated generally by the arrows 34.

In the intake section of the chamber 30, a wire mesh screen 36 is situated approximately one foot into the chamber for the purpose of collecting fiberglass chips, mask debris and other trash which may find its way into the rinse water flow. Preferably, the screen 36 is part of a removable basket 38 so that the filtering screen 36 can be cleaned periodically. If desired, additional filtering screens, such as screen 38, can be placed in the flow 34 through the chamber 30.

The rinse water is then pumped by pump 44 into a mixing tank 42 in the reactive chamber 40. Mixing chamber 42 receives sulfuric acid from a sulfuric acid holding tank 46 through valve 48 and conduit 50. A pH sensing probe 52 provides electrical signals corresponding to the pH which are fed back to a pH meter and controls 53 which actuate the opening of valve 48. Thus, as the pH sensing probe senses more or less acid, the valve 48 is correspondingly closed or opened to maintain a desired pH level in tank 42. The pH sensing probe 52 and acid valve control system 53 are standard apparatuses conventionally available, and will not be desired in any further detail herein, as it is considered that those skilled in the art are well aware of the operations of the sensing probes and valve control.

Blending equipment, marked "mixer" 54 is positioned within the mixing chamber to mix or blend the acid with the rinse water. The acidified rinse water then spills over into the displacement chamber 58. The displacement chamber comprises a series of tandem arranged boxes 60, a representative examle being more particularly shown in FIG. 3 of the drawings in an exploded view. Each individual box 60 has a grated bottom 62 having holes 64 through which the liquid can pass. Resting on top of the grated bottom 62 is a sieve 66, such as screen mesh. Aluminum tailings 68 are sandwiched between sieve 66 and a covering screen mesh 70.

The displacement chamber 58 contains twenty such boxes 60 in five rows of four each, arranged two high.

Each successive row is positioned slightly lower than the next preceding row so that the rinse water flowing from one row to the next will flow by gravity feed over the top of the baffles 74. The vertically tandem boxes 60, seen best in FIG. 1, rest on elevated blocks 76 to create a space or trough between the grate 62 of the lowermost box 60, and the floor 78 of the displacement chamber 58.

In each row, the rinse water flows down one column of vertically tandem boxes 60, and up the adjacent column. It is from this next adjacent column that the rinse water flows to the next lower row of boxes in the series to create a flow path denoted by the arrows 80. The aluminum tailings 68 held in the bottom of each box 60 are thus held at predetermined positions along the flow path 80.

In an experimental installation in an operating manufacturing plant, the displacement chamber 58, through which some 2000 gallons per day of contaminated water is processed, held approximately 230 gallons of water. In a standard shop, a maximum of 1.5 gallons per minute of water flow is usually considered sufficient to handle the heavy metal contaminated waste effluent, so that a complete flush through the displacement chamber 58 will take 2 hours and 45 minutes, or approximately 3 hours. Increasing the volume of the chamber and of the relatively pure metal, or increasing the temperature, will allow for a faster flow rate while maintaining the same amount of copper reduction. A more detailed explanation of the flow rate and displacement reaction will be given hereinbelow.

The rinse water flows through the space between the floor 78 and the lowermost box grate 62 once during the flow through each row. Copper being replaced by the aluminum settles to the floor 78 below the boxes 60, and thus is removed from the rinse water flow. The rinse water flowing into the final chamber 84, as indicated by arrow 86, is substantially free of very substantial amounts of the copper. A splash guard 88 may be provided to contain the rinse water within the reactive chamber 40.

The substantially copper-free rinse water is then directed into the plant's sewer system represented by conduit 90.

The copper-free rinse water collects into a second mixing tank 94. In the embodiment illustrated, selected waste water having principal concentrations of other metals from the printed circuit board manufacturing process is collected in tank 94. Similar to the acidification or mixing chamber 42, the tank 94 has a mixer 96 for blending the collected water. The tank 94 also has pH sensing probes 100 sending electrical signals corresponding to the pH level in the tank 94, to pH meter and valve controls 102. The pH meter and controls 102, similar to the pH meter and controls 53 for the acidification chamber 42, are standard devices available and known to those skilled in the art. The interior details will not be described further herein, except to note that the controls can be adjusted to regulate the liquid to any pH level desired.

The pH meter and controls 102 can operate the opening and closing of solenoid valve 104 for controlling the amount of caustic from the caustic or sodium hydroxide holding tank 106 going to tank 94. The collected waste water in tank 94 thus can have its pH regulated preparatory to being pumped or gravity fed into the city sewer. Optional pump 110 then pumps the waste water through conduit 112 into the external municipal sewer system or other waste disposal system.

In operation, rinse water containing principally copper sulfate, and possibly copper-ammonia complexes, cupric chlorides and electroless copper in solution are collected in collecting tank 30 after being strained through wire mesh 36 for filtering fiberglass chips, mask debris and other trash that might enter the rinse water. After passing under the baffle 32, further depositing debris on the floor of chamber 30, the filtered rinse water is pumped through pump 44 into the acidification and mixing chamber 42.

The pH sensing probes 52 convey electrical signals, corresponding to the pH level in the chamber 42, to the pH meter and controls 53, which in turn regulate the opening and closing of valve 48 controlling the acid introduced into the chamber 42.

It has been found that the most efficient acid is sulfuric acid, thus acidifying the rinse water solution to sulfonate the copper. It is preferred that a pH of 1.5 to 2.5 be maintained in the acidification chamber 42, so that the rinse water flowing through the displacement chamber 58 will be highly acidic. Increasing acidity (lowering pH) increases the rate of copper precipitation. Slightly less acidity on the order of pH 3 has been found to achieve less than satisfactory results.

The rinse water then flows for approximately three hours in the flow path 80 in the displacement chamber 58. In this flow path, the highly acidic rinse water passes over aluminum tailings 68 held at predetermined points along the flow path 80 in boxes 60. It has been found that 10 lbs. of aluminum tailings for each cubic foot, where the boxes 60 are conveniently approximately a cubic foot, has been an adequate quantity to produce extremely good results. It has also been found that 20 lbs. per cubic foot of the tailings is too much, tending to reduce the amount of reaction with the copper sulfate. There is, it is believed, a point below 10 lbs. per cubic foot which will be too fine of a distribution of the aluminum tailings, so that there will be not enough contact of the copper sulfate with the aluminum tailings to produce meaningful results.

During one experiment, approximatly 2,000 gallons were processed through the displacement chamber 58. Using the structure as defined hereinabove, the copper contained in the effluent to the city sewer was reduced in quantity to approximately 1.25 parts per million. The contamination of copper being treated was initially 800 parts per million. The water processed into tank 94 contained approximately 50 parts per million. The water so processed is combined with the remaining effluent from the shop in tank 94 before alkalinization and discharge into the municipal sewer. The total amount of effluent was approximately 80,000 gallons for the 24 hour period, so that the discharge contained approximately 1.25 parts per million. This quantity is considered to be negligible and no serious threat to living organisms.

It is not known precisely what chemical reaction occurs in the displacement chamber, but it is determined that approximately 95% or better of the copper in the rinse water is deposited on the floor 78 of the displacement chamber in substantially pure metal form. It is believed that the sulfuric acid attacks the pure metal aluminum to place in the solution aluminum ions having a valence of plus three. It is observed that hydrogen gas is given off through the top of the displacement chamber. The electrons from the aluminum supply the necessary electron energies to reduce the copper ions so that pure copper metal is formed and drops to the chamber floor 78.

It is believed that the formation of hydrogen gas prevents the copper from firmly attaching onto the aluminum, a frequent result when copper sulfate in solution is exposed to aluminum in an essentially neutral environment. Perhaps the hydrogen gas keeps the copper agitated in solution. Also, the hydrogen gas may form between the surface of the aluminum and the copper developing as a pure metal, to drop the copper and prevent it from plating on to the aluminum. Heating the bath in the displacement chamber 58 20° F. or more also increases the rate of copper precipitation.

The aluminum is depleted periodically by the process, and must be replaced. Standard laboratory procedures and tests can be employed to determine if the copper quantity inchamber 84 is such as to indicate that the process is no longer reducing the copper in the indicated amounts. One such test involves sampling chamber 84 and combining a like volume of the sample with concentrated ammonium hydroxide ($NH_4OH$). A distinctly blue color indicates a passage of copper and an exhaustion of the tailings 68. The retaining boxes 60 are easily removed from the apparatus so that fresh aluminum tailings or turnings 68 can be inserted between the sieve 66 and screen 70 over the grate 62. Increasing the quantity of aluminum in the tailings 68 increases the degree of copper precipitation, within the density limits indicated above.

Using hydrochloric acid produces an uncontrolled reaction, the results of which cannot be predicted. Phosphoric acid ($H_3PO_4$), while chemically suitable in laboratory experiments, is not the acid of choice because of its high cost and because its use results in adding phosphates to the waste water. Phosphates are objectionable in the municipal sewer systems and the environment. On the other hand, nitric acid ($HNO_3$) in experiments passivates the aluminum, placing an oxide coating over it.

FIG. 4 is a schematic, block diagram of the invention illustrating the essential steps of removing the copper from the copper compounds in the rinse water from copper etchings, copper plating and solder plating baths as well as copper from copper bearing pickling acids and electroless copper solutions resulting from printed circuit board manufacturing techniques. The copper compounds in this rinse water most frequently are in the form of copper sulfate, although copper-ammonium complexes and cupric chlorides as well as some electroless copper and formaldehyde copper may be found in the rinse water. In addition, the rinse water frequently will contain fiberglass chips and parts of the mask material used to mask these areas on the fiberglass substrate which are to remain conductive after the etching process.

Since the etching steps in the photographic copper plating techniques in printed circuit board plants are frequently open and exposed to workers, additional debris such as cigarette butts, trash and the like may be found in the rinse water. The rinse water is thus initially filtered, as indicated in block 10 of the schematic of FIG. 1. In the preferred embodiment, the rinse water is acidified block 12, having its pH lowered to approximately between 1.5 and 2.5. The rinse water is then flowed or passed through essentially pure metal. This metal is preferably substantially pure aluminum, but could be other metals such as iron. While aluminum and iron are known to work, it is believed that any metal stable in an aqueous acid solution having a relative position on the electromotive force table of elements greater than copper, will alternatively achieve results. Experiments with iron and aluminum have shown that the speed and rate of reaction resulting in the precipitation of copper will depend on the relative activities of the metals. Among these metals believed to be useful are magnesium and manganese.

In the filtration process 14, the aluminum substitutes for the copper in the $CuSO_4$ compound, precipitating the copper in a substantially pure metal form 16. The resulting liquid having aluminum sulfate $Al_2(SO_4)_3$ heavily in solution has the pH raised to a substantially neutral level 18 for disposing of it in the city sewer system. The copper can be reclaimed for its many industrial uses.

The foregoing detailed description of my invention in a preferred embodiment both as to apparatus and as to method is illustrative of several embodiments. It is to be understood, however, that additional embodiments may be perceived by those skilled in the art. Such additional embodiments, for example, would encompass the treatment of any highly concentrated heavy metal aqueous solutions such as spent plating baths or concentrated waste. The embodiments described herein together with those additional embodiments are considered to be within the scope of the present invention.

I claim:

1. An apparatus for reclaiming heavy metal from heavy metal salts in an aqueous solution, comprising:
   a. A reaction chamber defining a path for receiving and for conducting said solution therethrough;
   b. A source of concentrated acid sufficient to impart a pH less than 2 to said aqueous solution wherein said acid in solution has anions;
   c. First valve means connecting said concentrated acid to said reaction chamber, said valve means operable in response to the pH of said aqueous solution for admitting amounts of said acid into said reaction chamber to maintain the pH of said solution at a predetermined level at least less than 2; and
   d. Means for retaining, substantially pure aluminum stable in an acid aqueous solution, capable of forming a salt compound with said anions and having a relative electrode potential greater than that of the heavy metal to be reclaimed from the heavy metal salt in solution for precipitating said heavy metal from said heavy metal salt in said solution, said retaining means being positioned in said path in the reaction chamber at a plurality of points along said defined path.

2. The apparatus of claim 1 wherein said reaction chamber further includes an acidification chamber for holding said aqueous solution momentarily while receiving concentrated acid from said source, and wherein said first valve means connects said source to said acidification chamber.

3. The apparatus of claim 2 wherein said acidification chamber further includes means for mixing the aqueous solution and the concentrated acid injected therein.

4. The apparatus of claim 3 further including pH sensing probes positioned in said acidification chamber adapted to feed back electric signals corresponding to the pH of the aqueous solution in said acidification chamber, and further including valve control means for controlling said first valve means responsive to electric signals from said pH sensing probes.

5. The apparatus of claim 1 wherein said retaining means comprises removable boxes having grates for passing the aqueous solution therethrough and means for retaining tailings of said aluminum having an electrode potential greater than that of the reclaimed heavy metal.

6. The apparatus of claim 5 wherein said reaction chamber defining a path includes baffles, and at least two of said boxes are positioned vertically in tandem between successive baffles for channeling the aqueous solution down one series of vertically tandem boxes, under said baffle and up and down vertically tandem arranged boxes in the next succeeding section between successive baffles for passing the aqueous solution through said substantially pure metal aluminum having an electrode potential greater than that of the heavy metal being reclaimed.

7. The apparatus of claim 1 further comprising an alkalinization chamber connected to said reaction chamber for receiving at least a substantial portion of the aqueous solution at the end of said defined path, and further comprising second valve means connecting a source of alkaline material to said alkalinization chamber, said second valve means being operable in response to the pH of the aqueous solution in said alkalinization chamber to raise the pH to a substantially non-acidic level.

8. The apparatus of claim 7 further comprising pH probes in said alkalinization chamber adapted to send electrical signals corresponding to the pH in said alkalinization chamber to second valve control means for controlling said second valve means and for regulating the flow of alkaline material into said alkalinization chamber responsive to said signals from said pH probes.

9. The apparatus of claim 7 further comprising means for blending the aqueous solution in said alkalinization chamber.

10. The apparatus of claim 1 wherein said heavy metal salt comprises a copper salt.

11. An apparatus for purifying poisonous heavy metal copper from an aqueous solution containing poisonous heavy metal copper salts in solution, comprising:
   a. An acidification chamber for receiving said aqueous solution;
   b. A source of concentrated sulfuric acid sufficient to impart a pH of less than 2 to said aqueous solution, connected to said acificiation chamber by first valve means operable in response to the pH of said aqueous solution in said acidification chamber;
   c. A reaction chamber defining a path for receiving said aqueous solution from said acidification chamber and for conducting said aqueous solution through said path a predetermined period of time;
   d. A plurality of heavy metal retaining means for retaining substantially pure aluminum stable in said aqueous acid solution but having a relative electrode potential greater than that of the copper metal in said heavy metal copper salts in solution, at a plurality of predetermined points along said defined path for substituting said substantially pure aluminum with the heavy metal copper in the heavy metal salt in solution, to precipitate a substantially pure metal copper from the poisonous heavy metal salt;
   e. Means within said reaction chamber for receiving said relatively poisonous heavy metal copper in substantially pure metallic form; and
   f. An alkalinization chamber connected to said reaction chamber for receiving the aqueous solution, the alkalinization chamber being connected to a source of alkaline material through a second valve means operable in response to the pH of the solution in said alkalinization chamber to adjust the pH of solution in said alkalinization chamber to a neutral level for depositing in public waste water systems.

12. The apparatus of claim 11 wherein said defined path comprises a labyrinthine passage defined by a series of baffles in said reaction chamber channeling the aqueous solution by gravity feed both upwardly and downwardly in successive sections defined by said baffles.

13. The apparatus of claim 11 wherein said substantially pure metal retaining means comprises a plurality of boxes having grates on the floor thereof for retaining said substantially pure aluminum while allowing the aqueous solution to pass through and be filtered through said substantially pure aluminum retained thereon, wherein said boxes are arranged within sections and between said baffles.

14. The apparatus of claim 13 wherein at least two of said boxes are arranged vertically in tandem with each other in each of said sections defined by said series of baffles, and wherein said aqueous solution is channeled in a path going vertically downwardly in one section, under an adjacent baffle and upwardly and downwardly in the next adjacent section defined by said baffles through vertically tandem arranged boxes therein to pass the aqueous solution through said substantially pure metal tailings.

15. The apparatus of claim 11 wherein said means for receiving said poisonous metal in metallic form comprises a trough under said substantially pure metal retaining means, and wherein said heavy metal retaining means are positioned a spaced distance above said trough to channel the aqueous solution through said trough after passing through said substantially pure metal retaining means of each section defined by the baffles.

* * * * *